United States Patent [19]

Ostertag et al.

[11] 4,344,987

[45] Aug. 17, 1982

[54] PREPARATION OF FLAKY MICA PIGMENTS COATED WITH METAL OXIDES, AND USE OF THESE PIGMENTS

[75] Inventors: Werner Ostertag, Gruenstadt; Knut Bittler, Speyer; Gustav Bock, Neustadt, all of Fed. Rep. of Germany

[73] Assignee: BASF Aktiengesellschaft, Fed. Rep. of Germany

[21] Appl. No.: 286,605

[22] Filed: Jul. 24, 1981

[30] Foreign Application Priority Data

Aug. 8, 1980 [DE] Fed. Rep. of Germany ....... 3030056

[51] Int. Cl.$^3$ .............................................. C04B 31/26
[52] U.S. Cl. .................................... 427/213; 427/215; 106/291; 106/309; 106/308 B
[58] Field of Search .................. 106/291, 309, 308 B; 427/213, 215, 214

[56] References Cited

U.S. PATENT DOCUMENTS

| | | | |
|---|---|---|---|
| 3,220,875 | 11/1965 | Queneau | 427/213 |
| 3,839,077 | 10/1974 | Robinson | 427/213 |
| 4,146,403 | 3/1979 | Armanini et al. | 106/291 |

FOREIGN PATENT DOCUMENTS 1467468 12/1968 Fed. Rep. of Germany.
2313331 9/1974 Fed. Rep. of Germany.

*Primary Examiner*—Sam Silverberg
*Attorney, Agent, or Firm*—Keil & Witherspoon

[57] ABSTRACT

Flaky mica pigments coated with metal oxides are prepared by oxidizing vaporizable metal carbonyls to metal oxides with oxygen at an elevated temperature in the presence of mica flakes which are kept in motion. The amount of carbonyls introduced into the reaction zone does not exceed 5% by volume of the amount of other gases introduced.

The coated mica pigments are employed as pigments in surface coatings, plastics and glasses.

7 Claims, No Drawings

PREPARATION OF FLAKY MICA PIGMENTS COATED WITH METAL OXIDES, AND USE OF THESE PIGMENTS

Coated mica pigments, when used in surface coatings, plastic films or glass, can exhibit interesting optical effects due to the transmission and reflection of the light at the mica flake pigment, which is oriented in a foliaceous manner.

The pigments are referred to as nacreous if the coatings exhibit an iridescent, mother of pearl-like appearance. This appearance of the coating is due to interference phenomena and results from the fact that the mica substrate is coated with material whose refractive index differs greatly from that of mica and of the binder. Non-coated mica pigment does not exhibit nacreous effects, since mica has a very similar refractive index to that of the lacquer or plastic used as the binder (namely about 1.5) and accordingly is not optically differentiated from the binder. Only by applying coatings having a different, and generally higher, refractive index is it possible to cause the mica pigment to manifest itself optically. Coatings which have become particularly well known in the past consist of $TiO_2$, $ZrO_2$, $Fe_2O_3$, the corresponding hydroxides, and combinations thereof. For example, the nacreous pigments described in German Pat. No. 1,467,468, U.S. Pat. No. 4,146,403 and DT-OS No. 2,313,331 have a transparent coating, consisting of two components, namely first a colorless layer consisting of $TiO_2$ or $ZrO_2$ and, over this, a colored layer consisting of $FeOOH$, $Fe_2O_3$, $Cr_2O_3$ or $V_2O_5$.

All nacreous pigments or flaky pigments hitherto disclosed are prepared in an aqueous medium, in particular by introducing a milled mica pigment into a coating bath containing a metal salt, in which bath the metal compound is then decomposed by careful hydrolysis and the corresponding hydroxide is precipitated out onto the mica pigment. The precipitation process can be repeated. After coating, the pigment obtained is filtered off, washed, dried and in most cases also calcined.

Such processes for the preparation of coated flaky mica pigments are inherently very involved and expensive. They comprise diverse and in part very lengthy stages and must be very accurately controlled, especially during the coating stage. A further disadvantage of these processes is that hitherto it has not proved possible to produce intensely colored flaky pigments, which is probably due to the fact that intensifying the color by increasing the coating thickness is only possible to a very limited extent. As mentioned above, the procedure is always that first of all bulky hydroxides are deposited from the coating bath, and these are only converted to oxides in a later drying and calcining stage. The loss of volume associated with the removal of water means that thicker coatings easily lose their uniformity and accordingly the pigments lose their gloss. It is not unusual for the coating even to detach from the mica substrate.

This occurs particularly if the pigments are compounded with binders to give finishes, in which case the shearing forces generated during compounding cause the oxide layers to flake off. To reduce this disadvantage, the coated pigments can be calcined. With the aim of reducing the same disadvantage, U.S. Pat. No. 4,146,403 describes a process in which the mica pigment is first provided with a colorless intermediate layer or adhesion-promoting layer of titanium dioxide or aluminum oxide, before applying a colored final layer of iron oxides.

It is an object of the present invention to provide a process for the preparation of flaky mica pigments, coated with metal oxides, which does not exhibit the above disadvantages of the conventional processes and in which firmly adhering colored oxide layers can be produced in one step and in an easily reproducible manner.

We have found that this object is achieved by a process wherein a vaporizable metal carbonyl is oxidized with oxygen at an elevated temperature in the presence of mica flakes which are kept in motion, with the proviso that the amount of carbonyl introduced into the reaction zone does not exceed 5% by volume, based on the amount of the other gases introduced.

To carry out the process according to the invention, the flaky pigments are kept in motion in an apparatus suitable for this purpose, for example in a rotary tubular kiln or, preferably, in a fluidized bed reactor. When the pigments have been heated to the reaction temperature of 150°–450° C., preferably of 180°–250° C., the gases containing metal carbonyl, and the oxyen required for the combustion, are introduced into the reaction space. The amount of metal carbonyl vapor is chosen so that the concentration of metal carbonyl, based on the other gases introduced into the reaction space, does not exceed 5% by volume, and preferably does not exceed 1% by volume (at S.T.P., i.e. 20° C. and 760 mm Hg).

The metal carbonyls are advantageously introduced into the reaction space by means of a carrier gas which is inert toward the carbonyls, for example nitrogen or argon. There they react with the oxygen also introduced into the reaction space (the oxygen, for example in the form of air, advantageously being introduced together with the fluidizing gas if the reaction is carried out in a fluidized bed reactor), to give the metal oxide and gaseous carbon oxide. Under the stated reaction conditions, the metal oxide formed deposits on the flaky pigment and forms a coating thereon. Particularly uniform coatings are obtained in the preferred temperature range of from 180° to 250° C. The high dilution of the carbonyl in the gas space is an essential factor in ensuring that the metal oxide formed substantially deposits on the mica flakes. If the concentration of metal carbonyl exceeds 5% by volume, this occurrence is no longer ensured and instead metal oxide dust is formed predominantly, alongside uncoated mica flakes.

Suitable metal carbonyls are, in principle, all carbonyls which have a significant vapor pressure and give colored metal oxides. Examples are, in particular, chromium hexacarbonyl, iron pentacarbonyl and nickel tetracarbonyl.

If the reaction is to result in a metal oxide in which the metal is in the highest oxidation state, for example iron(III) oxide in the case of iron pentacarbonyl, at least as much oxygen as is required stoichiometrically to form $Fe_2O_3$ and gaseous carbon oxide must be introduced into the reaction space. An excess of oxygen is in that case not detrimental, though in general such excess is not more than 10%. The situation is different if the oxide layer to be formed does not correspond to the highest oxidation state of the metal. For example, in depositing oxide layers consisting of magnetite ($Fe_3O_4$), the carbonyl and oxygen must be introduced into the reaction space very accurately in the stoichiometric ratio.

The flaky silicate pigments and metal oxide pigments in general have a mean particle size such that the main dimension is from 5 to 400 μm, preferably from 30 to 100 μm, especially less than 70 μm, whilst the mean thickness is from 0.03 to 30 μm, preferably from 0.2 to 5 μm. To ensure mechanical stability of the flakes, the thickness should not be less than the minimum stated.

Suitable mica flake material for coating is, in particular, pale or white mica. Flakes consisting of muscovite, which is preferably employed in a wet-milled form, are particularly preferred. Of couse, other foliate silicate flakes, such as synthetic mica or glass flakes, can also be used.

The mica pigment coated with, for example, iron oxide exhibits different hues depending on the duration of coating. The initially yellowish coloration passes through yellowish brown and red to a final brownish violet. Of course the amount of iron oxide needed to coat the mica flakes in order to produce a particular hue depends on the particle size of the mica powder employed. If the particle size is from 70 to 90 μm, pigments containing 2% by weight of $Fe_2O_3$ are yellow, those with 7% by weight are red and those with 12% by weight are violet. The coating can, as desired, be stopped at any particular hue. The product, which does not require any after-treatment, can be taken from the reactor when it has cooled.

On decomposing nickel tetracarbonyl, on the other hand, grayish green pigments are obtained, whilst if iron pentacarbonyl is used but the decomposition is only taken to the magnetite stage, black pigments are obtained.

Using the pigments obtained by the process according to the invention, metallic effects can be achieved in finishes, coatings and plastic surface films. In contrast to the pigments obtained by wet-coating of flaky mica particles with colored oxides, the novel pigments, surprisingly, have an appearance essentially dictated by reflection.

EXAMPLE 1

200 g of milled muscovite mica having an average particle size corresponding to a main dimension of 100 μm and a mean thickness of 9 μm, and having a surface area, determined by the BET method, of 1.5 m$^2$/g, are introduced into a fluidized bed reactor, made of glass and having an internal diameter of 60 mm, the frit base being of quartz, and are fluidized with 300 liters of air/h. The temperature of the fluidized bed is raised to 250° C. by means of infrared heating. Iron pentacarbonyl vapor and nitrogen (carried gas) are then introduced through a nozzle located immediately above the frit of the fluidized bed. Per hour, 17 g of iron carbonyl and 100 liters of nitrogen carrier gas are introduced into the fluidized bed. Accordingly, the proportion of carbonyl, based on the other gases introduced into the fluidized bed, is 0.5% by volume (at 20° C. and 760 mm Hg).

The color of the flaky mica pigment is yellowish brown after 45 minutes and reddish brown after 120 minutes. After stopping the carbonyl feed, the coated pigment is cooled and can then be taken from the reactor.

The pigment, which has a reddish brown glitter, is milled with an alkyd/melamine resin varnish (DIN Draft 53,238) and the dispersion is knife-coated onto a substrate. The resulting reddish brown surface-coating film exhibits a metallic effect.

EXAMPLE 2

200 g of wet-milled sieved muscovite having an average particle size corresponding to a main dimension of 50 μm and a mean thickness of 4 μm fluidized, in the apparatus described in Example 1, with 300 liters/h of air and, additionally, 300 liters/h of nitrogen. The temperature of the fluidized bed is raised to 220° C. by means of infrared radiators arranged around the reactor. 145 g/h of iron carbonyl vapor and 100 liters/h of nitrogen carrier gas are then introduced into the fluidized bed. The proportion of carbonyl, based on the other gases introduced into the fluidized bed, is 0.25% by volume (at 20° C. and 760 mm Hg). The mica is yellow after a coating time of 10 minutes, yellowish brown after a further 40 minutes and brownish red after a further 70 minutes.

The cooled product taken from the reactor shows, on examination by scanning electronmicroscopy, that the mica flakes are coated with $Fe_2O_3$. The iron oxide can be identified as $\alpha$-$Fe_2O_3$ by X-ray diffraction. When milled with an alkyd/melamine resin varnish, the pigment can be used to produce very glossy films in which the metallic effect is particularly prominent on a dark substrate.

EXAMPLE 3

180 g of milled muscovite of average particle size corresponding to a main dimension of 90 μm and a mean thickness of 5 μm, and having a surface area, measured by the BET method, of 1.7 m$^2$/g, are fluidized with 250 liters/h of nitrogen and 50 liters/h of air in the apparatus described in Example 1, and brought to 250° C. by infrared heating. 10 g of nickel tetracarbonyl and 200 liters/h of nitrogen are then injected into the fluidized bed. After two hours, a grayish black, glistening pigment is obtained. The proportion of carbonyl, based on the other gases introduced into the fluidized bed, is 0.26% by volume (at 20° C. and 760 mm Hg).

EXAMPLE 4

210 g of milled muscovite mica having an average particle size corresponding to a main dimension of 90 μm and a mean thickness of 7 μm, and having a surface area, measured by the BET method, of 1.0 m$^2$/g, are fluidized with 300 liters/h of nitrogen and 20 liters/h of air in the apparatus described in Example 1. 11.3 g/h of iron pentacarbonyl vapor and 100 liters/h of nitrogen are then introduced into the fluidized bed, which is heated to 300° C. After 2.5 hours, the pigment has acquired a deep black glistening color. When dispersed in a plastic, the pigment exhibits a metallic effect. The amount of iron pentacarbonyl, based on the other gases introduced into the fluidized bed, is 0.3% by volume (at 20° C. and 760 mm Hg).

EXAMPLE 5

15 kg of wet-milled muscovite having an average particle size corresponding to a main dimension of 80 μm and a mean thickness of 3 μm are introduced into a fluidized bed reactor which has an internal diameter of 300 mm and is equipped with a frit base and with electrical heating; the charge is fluidized with 5,000 liters/h of nitrogen and 550 liters/h of air. It is then heated to 230° C. by means of the electrical heating. 330 g/h of iron pentacarbonyl vapor together with 2,400 liters/h of nitrogen are then introduced into the fluidized bed through a nozzle in the frit base (amount of iron carbonyl=0.5% by volume, based on the other gases introduced into the fluidized bed, at 20° C. and 760 mm Hg). After 10 hours, the mica pigment has acquired a yellowish red coloration.

If the yellowish red pigment is milled with an alkyd/melamine resin varnish (DIN Draft 53,238) and the mixture is knife-coated onto a substrate, the coating exhibits a distinct metallic effect, especially if the substrate is dark.

The iron oxide-coated mica flakes have exceptionally good light resistance and heat resistance (to above 500° C.).

We claim:

1. A process for the preparation of a flaky mica pigment coated with metal oxide, wherein a vaporizable metal carbonyl is oxidized with oxygen at an elevated temperature in the presence of mica flakes which are kept in motion, with the proviso that the amount of carbonyl introduced into the reaction zone does not exceed 5% by volume, based on the amount of the other gases introduced.

2. A process as claimed in claim 1, wherein the oxidation of the metal carbonyl is carried out in a fluidized bed of the mica flakes.

3. A process as claimed in claim 1 or 2, wherein the metal carbonyl employed is iron pentacarbonyl or nickel tetracarbonyl.

4. A process as claimed in claim 1, wherein the mica flakes have a mean particle size corresponding to a main dimension of from 5 to 400 $\mu$m and a thickness of from 0.03 to 30 $\mu$m.

5. A process as claimed in claim 1, wherein the mica flakes are white wet-milled mica.

6. A process as claimed in claim 1, wherein the oxidation is carried out at from 150° to 450° C.

7. A process as claimed in claim 1, wherein the oxidation is carried out at from 180° to 250° C.

* * * * *